United States Patent
Henry et al.

(10) Patent No.: US 11,245,590 B1
(45) Date of Patent: Feb. 8, 2022

(54) NEIGHBOR LIST ADAPTIVE MAPPING

(71) Applicant: Cisco Technology, Inc., San Jose, CA (US)

(72) Inventors: Jerome Henry, Pittsboro, NC (US); Vishal S. Desai, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/984,797

(22) Filed: Aug. 4, 2020

(51) Int. Cl.
*H04L 12/24* (2006.01)
*H04L 29/08* (2006.01)
*H04W 4/021* (2018.01)
*H04W 48/16* (2009.01)

(52) U.S. Cl.
CPC .............. *H04L 41/12* (2013.01); *H04L 67/16* (2013.01); *H04W 4/021* (2013.01); *H04W 48/16* (2013.01)

(58) Field of Classification Search
CPC ........ H04L 41/12; H04L 67/16; H04W 4/021; H04W 48/16
See application file for complete search history.

(56) References Cited

U.S. PATENT DOCUMENTS

| | | | |
|---|---|---|---|
| 10,595,185 B1 * | 3/2020 | Chen | ............... H04W 72/12 |
| 2009/0117891 A1 | 5/2009 | Chou | |
| 2014/0195149 A1 * | 7/2014 | Yang | ............... G01C 21/005 701/445 |
| 2018/0213355 A1 * | 7/2018 | Smith | ............... H01Q 1/3241 |
| 2018/0255426 A1 * | 9/2018 | Liao | ............... G06F 3/04883 |
| 2020/0245260 A1 * | 7/2020 | Desai | ............... H04W 52/245 |

FOREIGN PATENT DOCUMENTS

| | | |
|---|---|---|
| GB | 2489770 A | 10/2012 |
| WO | 2005062066 A2 | 7/2005 |
| WO | 2009084051 A1 | 7/2009 |

OTHER PUBLICATIONS

Notification of Transmittal of the International Search Report and The Written Opinion of the International Searching Authority issued in International Patent Application PCT/US2021/043449, dated Nov. 12, 2021 (16 pages).

* cited by examiner

*Primary Examiner* — Philip J Chea
*Assistant Examiner* — Hassan A Khan
(74) *Attorney, Agent, or Firm* — Merchant & Gould P.C.

(57) ABSTRACT

Neighbor list adaptive mapping may be provided. A request to a client device to provide a client device view of a network may be sent periodically at a time interval. A length of the time interval may be dependent on a condition at the client device and identity data may be associated with the client device. In response to sending the request to the client device, data corresponding to the client device view of the network may be received. Then, in response to receiving the data, a map of the network may be updated based on the received data corresponding to the client device view of the network. The map may be associated with the identity data associated with the client device.

17 Claims, 5 Drawing Sheets

NEIGHBOR LIST ADAPTIVE MAPPING

TECHNICAL FIELD

The present disclosure relates generally to mapping of neighbor lists in a wireless network.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices to one wired connection. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
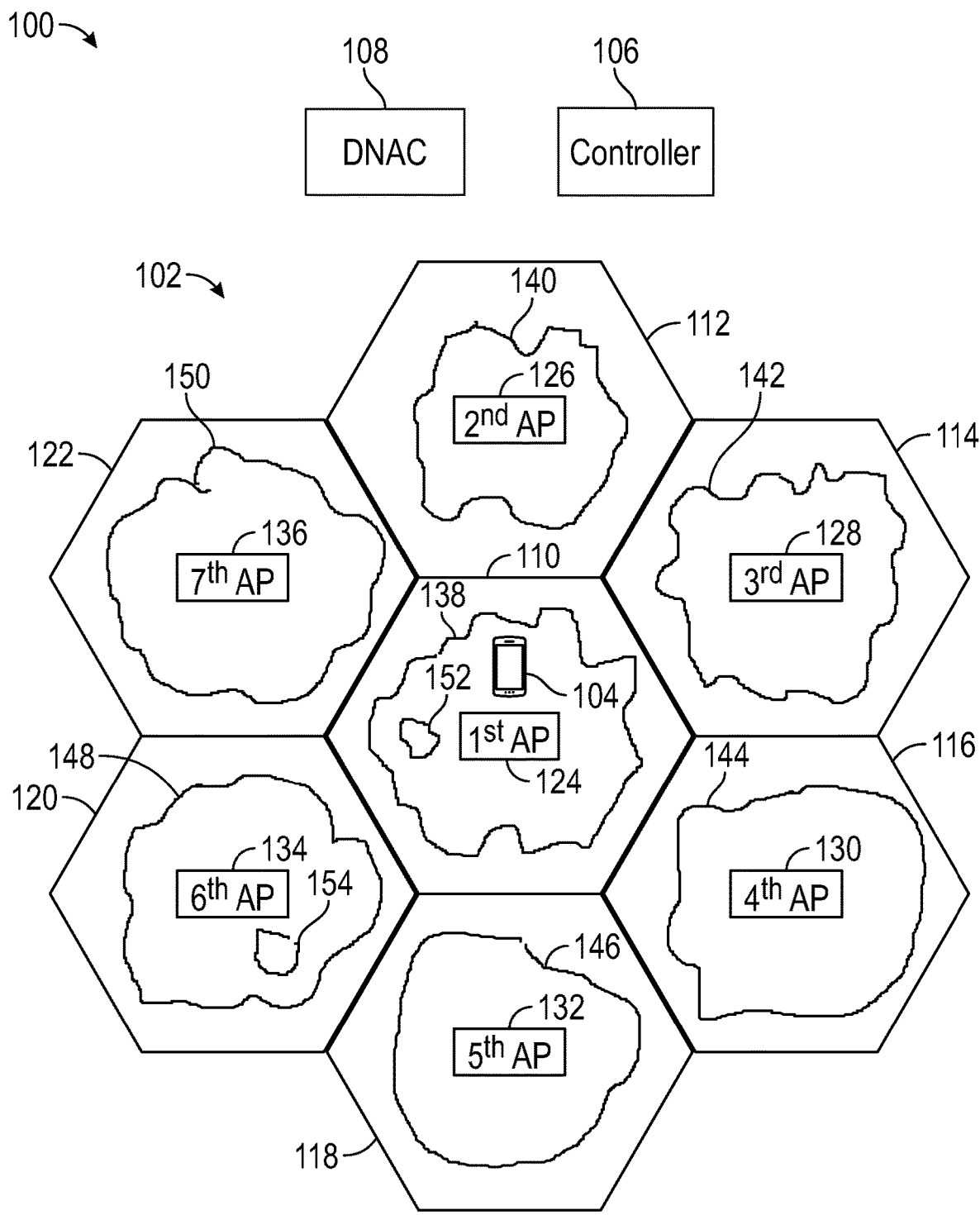
FIG. 1 is a block diagram of wireless network.

Neighbor list adaptive mapping may be provided. A request to a client device to provide a client device view of a network may be sent periodically at a time interval. A length of the time interval may be dependent on a condition at the client device and identity data may be associated with the client device. In response to sending the request to the client device, data corresponding to the client device view of the network may be received. Then, in response to receiving the data, a map of the network may be updated based on the received data corresponding to the client device view of the network. The map may be associated with the identity data associated with the client device.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

There are several modes by which an AP may request a client device to perform a scan of a wireless network. One mode may comprise an AP asking a client device to scan a particular channel (e.g., the current channel, on which the AP and the client operate, "on-channel mode"), and report what it hears ("this is how the client device sees the AP, and potential neighboring APs on the same channel"). This mode may be only useful if differences are expected in views between the upstream (i.e., how the client device sees the AP) and downstream (i.e., how the AP sees the client device). Otherwise, it may be a waste of airtime and client device battery power.

Another mode may be where the AP asks the client device to scan for multiple channels (e.g., possibly an entire spectrum band, "band mode") and report what it detected. This mode may be useful to have a deep understanding of the client device view, but may be highly disruptive for the client device (e.g., battery power expenditure and a long time out of the channel while the client device may need to send or receive data). Yet another mode may be where the AP asks the client device to simply forward the result of its last scan (e.g., "table mode"). This mode may be the least disruptive; however, if the client device scanned a while ago, then the information may be stale (e.g., not reflective of what the client device would hear at its current location).

Embodiments of the disclosure may provide a process to trigger a client device to send its view of a wireless network. Then a comprehensive map of the client device view may be built that combines conservation of individual client device battery power, minimal disruption of client activity (e.g., especially at the edge of a cell where the client device may already be in difficulty) while creating a comprehensive map throughout the floor. Such a map may be implemented on a Digital Network Architecture Center (DNAC) and may bring value for troubleshooting client device Radio Frequency (RF) issues or seed Radio Resource Management (RRM) with client device view information. Embodiments of the disclosure may implement two processes in the DNAC for example, one process may be designed to build a predictive map for a specific client type (e.g., based on identity data), and another process that may be used in troubleshooting a particular client device connection. The troubleshooting process may be a specific embodiment where the process may be applied to a single client device, so as to trace the view of the wireless network for that client device, in near real time, as the client device moves.

FIG. 1 shows a block diagram of wireless network 100 for providing neighbor list adaptive mapping. As shown in FIG. 1, wireless network 100 may comprise a plurality of cells 102 in which client device 104 may roam. Plurality of cells 102 may have a corresponding plurality of wireless Access Points (APs) that may establish a Wireless Local Area Network (WLAN) in order to provide client device 104 network connectivity.

Site specific policies may be provisioned on a Wireless Local Area Network controller (WLC) 106 for the plurality of APs to join wireless network 100 and to allow WLC 106 to control wireless network 100. Consistent with embodiments of the disclosure, a Digital Network Architecture Center (DNAC) controller 108 (i.e., a Software-Defined Network (SDN) controller) may configure information for wireless network 100 in order to provide neighbor list adaptive mapping consistent with embodiments of the disclosure.

Plurality of cells 102 may comprise a first cell 110, a second cell 112, a third cell 114, a fourth cell 116, a fifth cell 118, a sixth cell 120, and a seventh cell 122. First cell 110 may correspond to a first AP 124, second cell 112 may correspond to a second AP 126, third cell 114 may correspond to a third AP 128, fourth cell 116 may correspond to a fourth AP 130, fifth cell 118 may correspond to a fifth AP 132, sixth cell 120 may correspond to a sixth AP 134, and seventh cell 122 may correspond to a seventh AP 136.

Each of plurality of cells 102 may comprise a zone edge that may indicate a change between an inner region of a coverage area of an AP and an outer region of a coverage area of an AP. For example, the zone edge may indicate a signal level from where the client device experience may not be optimal anymore as the client device moves away from an AP that it is associated with from the inner region to the outer region. This non-optimal signal level may comprise, but is not limited to, to −65 dBm or lower that may define where the outer region of the coverage area of an AP may begin. First cell 110 may correspond to a first zone edge 138, second cell 112 may correspond to a second zone edge 140, third cell 114 may correspond to a third zone edge 142, fourth cell 116 may correspond to a fourth zone edge 144, fifth cell 118 may correspond to a fifth zone edge 146, sixth cell 120 may correspond to a sixth zone edge 148, and seventh cell 122 may correspond to a seventh zone edge 150. Some of the inner regions may have holes where the signal strength may be compatible with the outer region. For example, first cell 110 may comprise a first hole 152 and sixth cell 120 may comprise a second hole 154. These holes may have been created, for example, by barriers that may degrade the signal strength from their respective APs.

As stated above, wireless network 100 may comprise Wi-Fi APs that may be configured to support a wireless (e.g., Wi-Fi) hotspot. The Wi-Fi hotspot may comprise a physical location where a user, operating client device 104, may obtain access to wireless network 100 (e.g., Internet access), using Wi-Fi technology, via a WLAN using a router connected to a service provider.

In other embodiments of the disclosure, rather than APs, devices may be used that may be connected to a cellular network that may communicate directly and wirelessly with end use devices (e.g., client device 104) to provide access to wireless network 100 (e.g., Internet access). For example, these devices may comprise, but are not limited to, eNodeBs (eNBs) or gNodeBs (gNBs). The aforementioned cellular network may comprise, but is not limited to, a Long Term Evolution (LTE) broadband cellular network, a Fourth Generation (4G) broadband cellular network, or a Fifth Generation (5G) broadband cellular network, operated by a service provider. Notwithstanding, embodiments of the disclosure may use wireless communication protocols using, for example, Wi-Fi technologies, cellular networks, or any other type of wireless communications.

Client device 104 may comprise, but is not limited to, a phone, a smartphone, a digital camera, a tablet device, a laptop computer, a personal computer, a mobile device, a cellular base station, a telephone, a remote control device, a set-top box, a digital video recorder, a cable modem, a network computer, a mainframe, a router, or any other similar microcomputer-based device capable of accessing and using a Wi-Fi network or a cellular network.

The elements described above of wireless network 100 (e.g., controller 106, DNAC 108, first AP 124, second AP 126, third AP 128, fourth AP 130, fifth AP 132, sixth AP 134, and seventh AP 136) may be practiced in hardware and/or in software (including firmware, resident software, microcode, etc.) or in any other circuits or systems. The elements of wireless network 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of wireless network 100 may also be practiced using other technologies capable of performing logical operations such as, for example, AND, OR, and NOT, including but not limited to, mechanical, optical, fluidic, and quantum technologies. As described in greater detail below with respect to FIG. 5, the elements of wireless network 100 may be practiced in a computing device 500.

Figure 2:
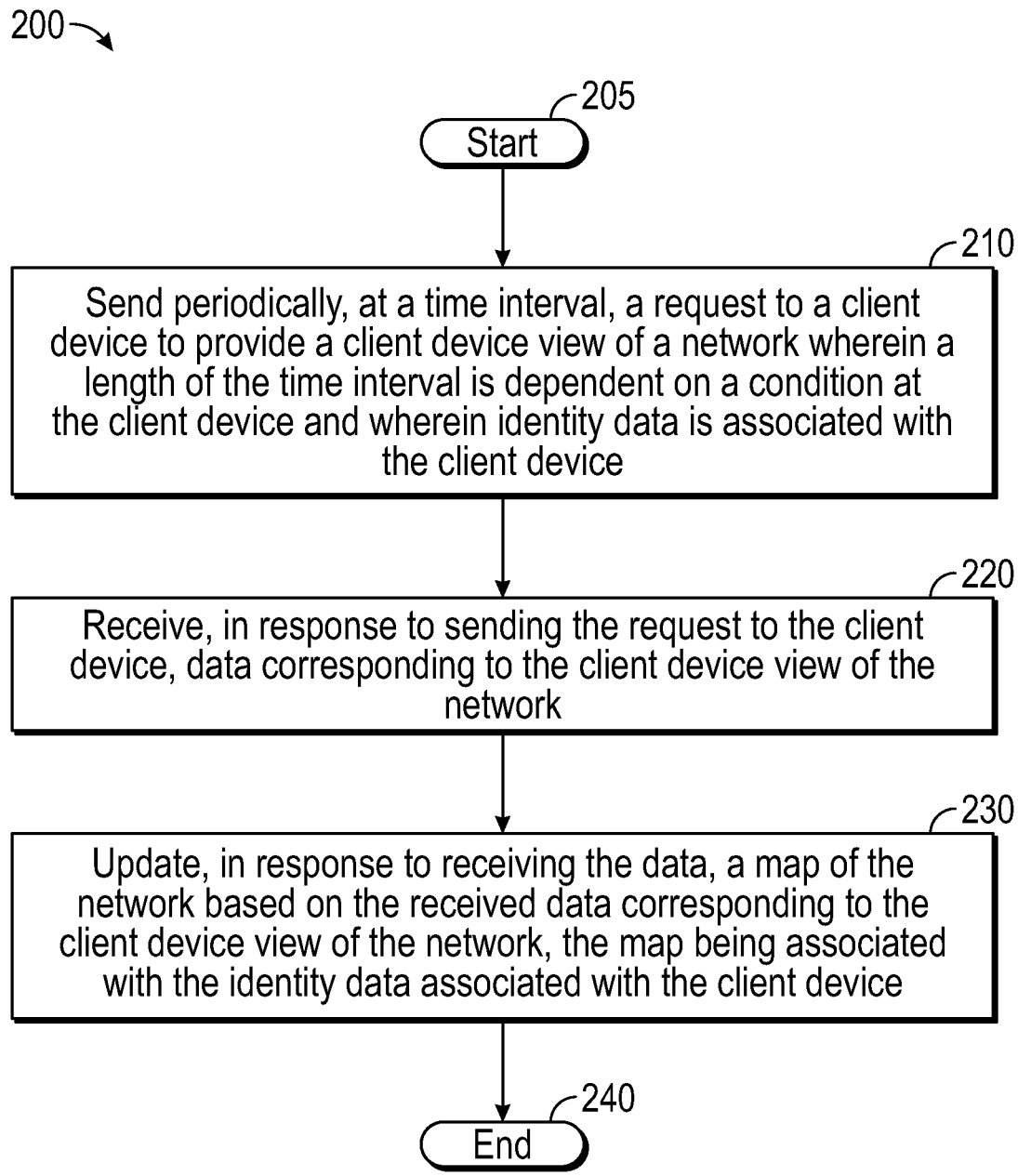
FIG. 2 is a flow chart of a method for providing neighbor list adaptive mapping.

FIG. 2 is a flow chart setting forth the general stages involved in a method 200 consistent with an embodiment of the disclosure for providing neighbor list adaptive mapping. Method 200 may be implemented using a computing device 500 as described in more detail below with respect to FIG. 5. Ways to implement the stages of method 200 will be described in greater detail below.

Method 200 may begin at starting block 205 and proceed to stage 210 where first AP 124 may send periodically, at a time interval, a request to client device 104 to provide a client device view of wireless network 100. A length of the time interval may be dependent on a condition at client device 104. In addition, identity data may be associated with client device 104. For example, as client device 104 enters a venue and attempts to associate to wireless network 100, client device 104 may send identifiers (e.g., identity data) such as device type and Operating System (OS). This data may be stored in controller 106, DNAC 108, or any of the plurality of APs in wireless network 100. One embodiment may be where the identity data is used to establish a client device typology (e.g., "phone" vs "tablet" or "laptop"). A more refined embodiment may be where the client device family is also factored (e.g., Samsung S10, iPhone XI). Another embodiment may be where individual implementations are also factored (e.g., the full SSG S10 w/A.9.1). The identity data may comprise, but not limited to, data indicating the client device comprising a tablet, the client device comprising a phone, the client device comprising a laptop, an operating system of the client device, and the client device comprising a device type within a family of devices. Some embodiments may result in coverage maps that take longer to build (and higher processing cost), but having higher prediction accuracy.

As client device 104 associates with first AP 124, first AP 124 may push a query to client device 124 to send its table list built during the scanning phase before client device 124 associated with first AP 124. From this client signal (as detected at first AP 124) and DNAC configuration, zone edges (e.g., first zone edge 138, second zone edge 140, third zone edge 142, fourth zone edge 144, fifth zone edge 146, sixth zone edge 148, and seventh zone edge 150) associated with an inner region an outer region as described above with respect to FIG. 1 may be determined for each AP in wireless network 100. A zone edge may indicate a signal level (e.g., a Received Signal Strength Indicator (RSSI)) from where a client device experience may not be optimal as the client device moves away from an AP that it is associated with from the inner region to the outer region. This non-optimal signal level may comprise, but is not limited to, to −65 dBm or lower that may define where the outer region of the coverage area of an AP may begin for example.

From stage 210, where first AP 124 sends periodically, at the time interval, the request to client device 104 to provide the client device view of wireless network 100, method 200 may advance to stage 220 where first AP 124 may receive, in response to sending the request to client device 104, data corresponding to the client device view of wireless network 100. For example, at regular intervals, first AP 124 may send a request (e.g., an Institute of Electrical and Electronics Engineers (IEEE) 802.11k neighbor request) to client device 104. If client device 104 is within the inner region (e.g., of first cell 110), not actively communicating, and not moving (e.g., the RSSI being around a stable value and probe RSSI on the top n (e.g., 3) neighbors have low variance), first AP 124 may send requests at a slow pace (e.g., the time interval may comprise a first value) that may be configurable on DNAC 108. If client device 104 is within the inner region (e.g., of first cell 110), actively communicating, but not using real time flows (e.g., Voice or Video queues, and not moving (e.g., the RSSI being around a stable value and probe RSSI on the top n (e.g., 3) neighbors have low variance), first AP 124 may send requests at an even slower pace (e.g., the time interval comprises a second value that is greater than the first value) that may be configurable on DNAC 108. If client device 104 is within the inner region (e.g., of first cell 110), actively communicating using real time flows (e.g., Voice or Video queues, and not moving (e.g., the RSSI being around a stable value and probe RSSI on the top n (e.g., 3) neighbors have low variance), first AP 124 may stop or suspend sending requests.

In other embodiments, an AP may detect client devices in similar locations (e.g., reporting similar neighbor APs counts and signal levels). The AP may then request each client device to scan a subset of channels (e.g., including partially overlapping subsets). The AP may then concatenate the results while computing the likely offset for each reporting client device. In another embodiment, the AP may use compressive sensing techniques between the client devices to offload off-channel scans. In this embodiment, the AP may also detect clients in similar location as above. The AP may also identify least busy client devices (e.g., this may be done with a traffic count over time, and determination of largest available time slots between client device upstream transmissions), then ask scanning from those clients with the largest free interval between transmissions in a round robin scheduling for example. These embodiments may be combined to minimize the time/energy spent by each client device scanning while maximizing the neighbor data feedback to the AP.

The requests made by the AP may follow a structured pattern. For example, in one embodiment, the AP may start by querying the client for a full-band report. Then, the AP may consider the client report to determine the general region of the client device. DNAC 108 may use AP signals to build a relative position map even without using location services. Based on such a determination and the client report, the AP may determine the general region of the client device. Location techniques (e.g., RSSI trilateration, Angle-of-Arrival (AoA), Fine Time Measurements (FTM)) may augment the accuracy. However, embodiments of the disclosure may not be limited to these processes and may not require location accuracy, instead, it may rely on signal strength regions.

Figure 3:
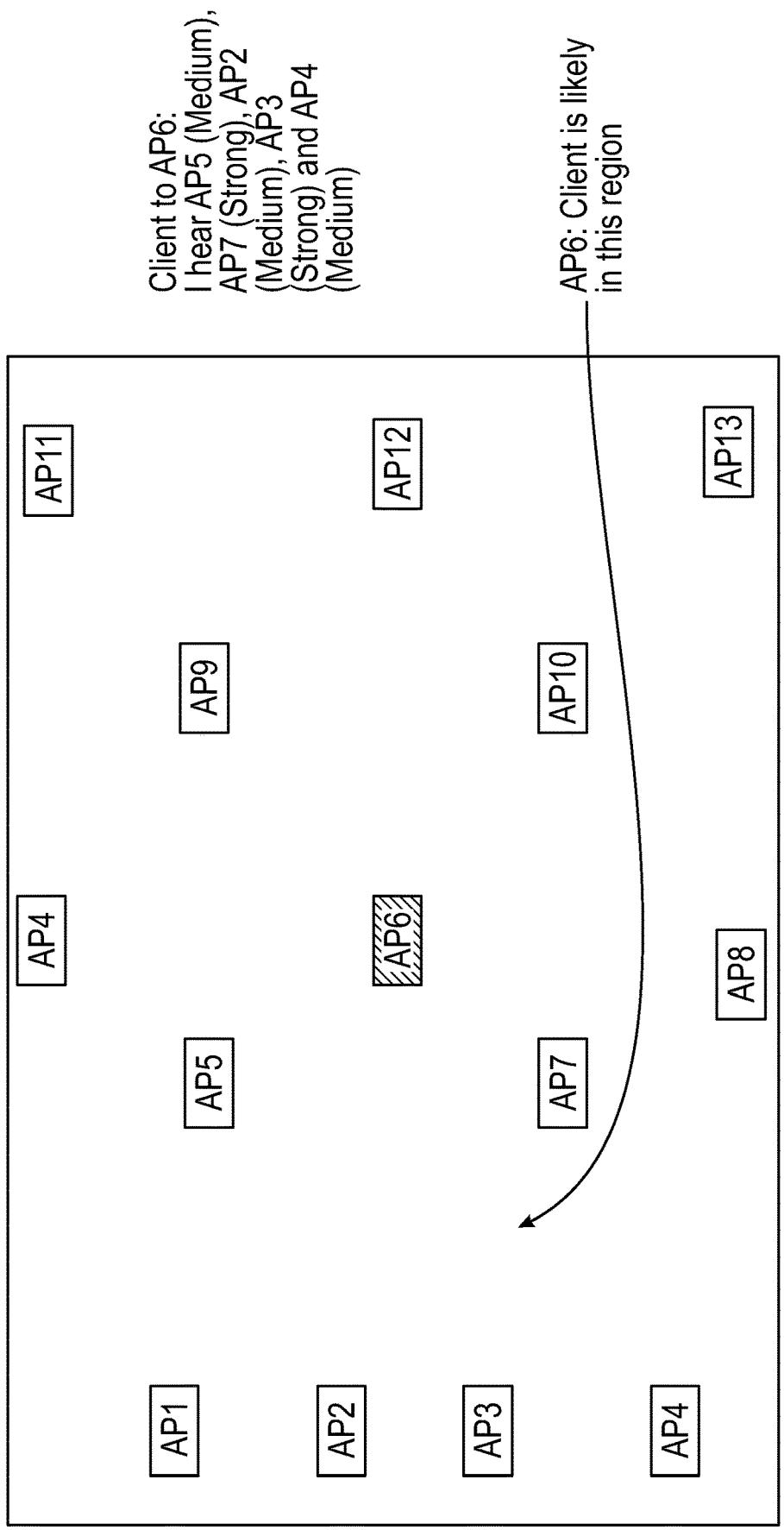
FIG. 3 illustrates location determination relying on signal strength regions.

FIG. 3 illustrates location determination relying on signal strength regions. As shown in FIG. 3, a client may report to AP6 that it hears AP5 a medium signal strength level, AP7 at a strong signal strength level, AP2 at a medium signal strength level, AP3 at a strong signal strength level, and AP4 at a medium signal strength level. Given these signal strength levels, AP6 may determine that the client is in the region indicated in FIG. 3. When such a determination is achieved, the AP may then limit the subsequent requests to sub-groups of the band (e.g., only channels where the client device reported APs or the channels in this area where the AP would expect the client device to detect APs). Similarly, the AP may limit subsequent queries to on-channel queries. Additionally, the AP may also use compressive sensing as described above in order to limit the scanning effort from individual client devices while still obtaining an optimal neighbor map.

Figure 4:
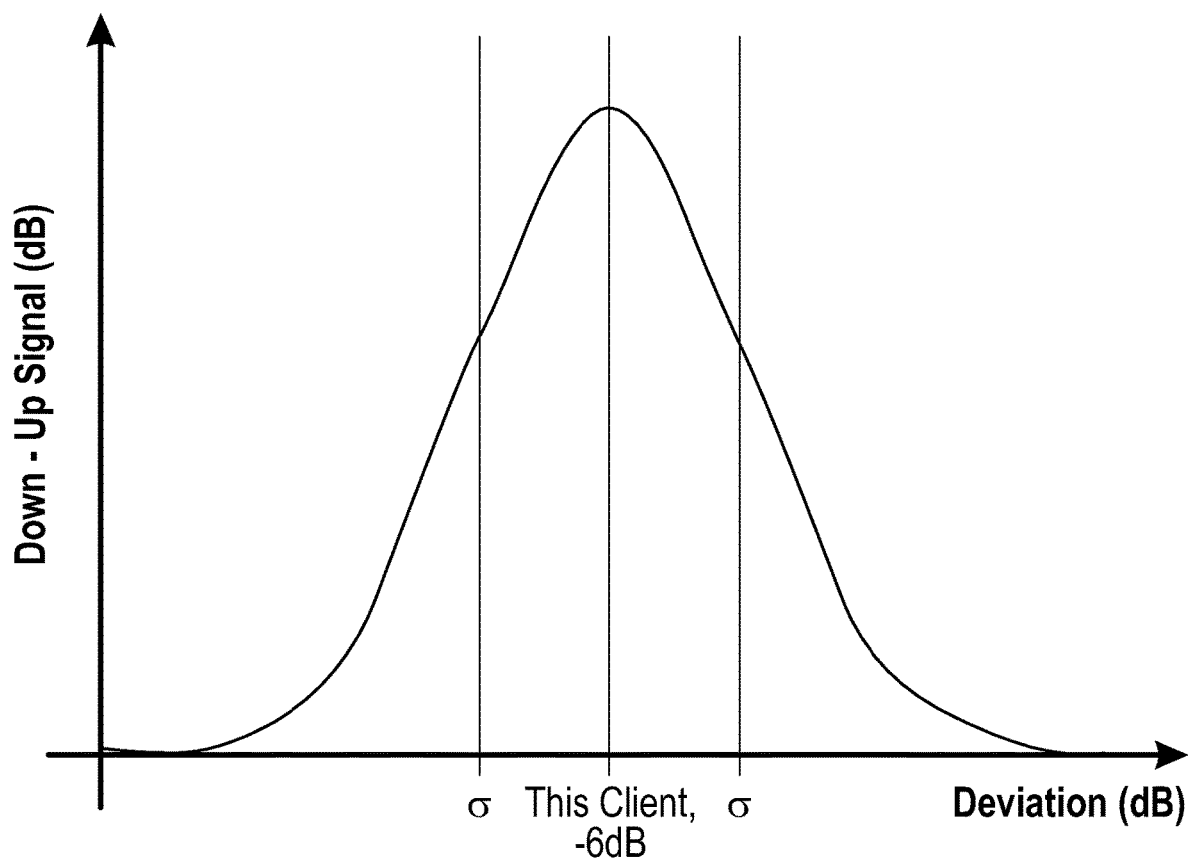
FIG. 4 illustrates a variance of a difference between an upstream Received Signal Strength Indicator (RSSI) and a downstream RSSI.

FIG. 4 illustrates a variance (sigma) of a difference between an upstream Received Signal Strength Indicator (RSSI) and a downstream RSSI. When an AP queries a client device for on-channel measurement, it is expected that there may be a difference between the upstream RSSI and the downstream RSSI. The AP not only records the RSSI difference, but also the variance (sigma) of that difference. In a stable RF environment, the variance (deviation of the UL-DL signal difference) should be stable. As soon as the variance changes (e.g., increases), a trigger signals to the AP that RF conditions appeared at the client device level that are not seen at the AP level. The AP then changes its request pattern to query more often on-channel, or in-band mode. This provision may also be valid as the client device moves (signal changes, within the inner zone). As the client device moves, the UL and DL RSSI may change; however, the variance should only change if RF conditions are asymmetric (different at AP location and client location). Thus, the variance may also be used as an estimator of changing RF conditions.

In another embodiment, client devices from similar vendor, models, and chipsets may be grouped in bins (e.g., client type A and client type B, reporting similar UL vs. DL differences and variances (e.g., because they may embark similar radio front end systems). With this embodiment, variations reported by a client may also apply to other clients of the same type (e.g., same bin) in the close neighborhood. Similarly, this embodiment may allow the system to detect outliers (i.e., clients with low efficiency that may report considerable variations even when/where other clients do not report variations). These large-variance client devices may be isolated in an unreliable bin and their result discarded.

As the client device uses traffic, there may be times when the AP may not be able to (or may not be set to) query the client device, thus creating "gaps" in the coverage map (e.g., a zone where the AP has no direct report from the client device). A module may record client devices and their path. As more client devices of the same type (or same bin) may appear in the same region, the AP may query these client devices, and may build a confidence map. RSSI may be stochastic and therefore consecutive reports, even from the same client device and same location, may display RSSI differences. If, for a given region, the AP receives consecutive reports which difference helps the AP establish the deviation, other reports from other client devices within the same region may increase the AP map confidence for that region (and vice versa). For regions where confidence is high, the AP may only query new client devices for in-band reports when there are gaps are in the client map. The AP may use the on channel reports to query and verify the confidence value. A goal of the above provision may be to limit the queries to the strict minimum, only increasing query frequencies when the UL-DL variance changes, in regions of low confidence, or in regions where gaps are recorded.

When a client device enters an outer region, the client device may scan multiple channels (including its current channel) to discover new APs. As soon as the client device is back on the current channel after scan (detected because the client device may have sent a probe request on the local channel, then set its "sleep" bit to 1 while scanning other channels, then returned to the local channel and set its "sleep" bit back to 0), the AP may query the client device for a table report, thus getting the latest client view of all channels.

Embodiments of the disclosure may send, for example, a "switch to LTE" request to the client device. A client device declining this request may indicate that the wireless network 100 may be usable from its standpoint. This information may be used to move the boundary between "inner" and "edge" areas (for example, as more clients indicate "good WIFI", the "inner" area may move slowly toward that point).

In many cases, the client device may report APs unknown to the system (e.g., rogue APs). Embodiments of the disclosure may map the position of these APs on the map with a specific "rogue" label that may further indicate if the rogue expresses the same SSIDs or others. In other embodiment, client devices may report hidden nodes. In this case, a client device may report APs in the beacon report that may be missing in its serving AP's neighbor list view. Information about these APs may be stored and highlighted on the map.

In other embodiments, active sensors may be placed on the floor. As their locations may be known, they may be used as a "distance candle". Similarly to the above, observation of their uplink/downlink reports, and their variance may be used with two additional purposes as described below. First, a detection of changing RF conditions at the sensor location may be used. As sensors are observed over a large time interval, it may be expected that their variance may be well known. Sudden changes may be detected and may be likely to affect other clients in the same region, thus signaling a change in the RF environment (e.g., temporal or new obstacle). Second, when other clients are detected in the vicinity of the sensor, the AP may query both for on-channel or a small channel subset scan, then compare the results. The offset may then be used to estimate the client signal on other channels, based on the known reports of the sensor for these channels.

As more client devices of each type appear on the floor, the AP may record and forward to DNAC 108 each new client on-channel report and variance. DNAC 108 may then compare to the other client devices and the confidence values. Then, DNAC 108 instructs the AP (e.g., through controller 106) to only query client types and regions for which confidence is low or gaps exist. This way, for example, a client device of known type moving on a floor for which confidence is high (for that client type) may not be asked for a report (and the system may rely on outer-regions natural scans and reports to confirm the confidence level). A new client type, or a known client device in a region of low confidence (or with multiple gaps) may be instructed to report more often, or report on more channels.

Once first AP 124 receives, in response to sending the request to client device 104, the data corresponding to the client device view of wireless network 100 in stage 220, method 200 may continue to stage 230 where first AP 124, controller 106, or DNAC 108 may update, in response to receiving the data, a map of wireless network 100 based on the received data corresponding to the client device view of wireless network 100. The map may be associated with the identity data associated with client device 104. For example, embodiments of the disclosure may implement two processes in DNAC 108 for example, one process may be designed to build a predictive map for a specific client device type (e.g., based on identity data), and another process that may be used in troubleshooting a particular client device connection. The troubleshooting process may be a specific embodiment where the process may be applied to a single client device, so as to trace the view of wireless network 100 for that client device, in near real time, as the client device moves. Once first AP 124, controller 106, or DNAC 108 updates, in response to receiving the data, a map of wireless network 100 based on the received data corresponding to the client device view of wireless network 100 in stage 230, method 200 may then end at stage 240.

Figure 5:
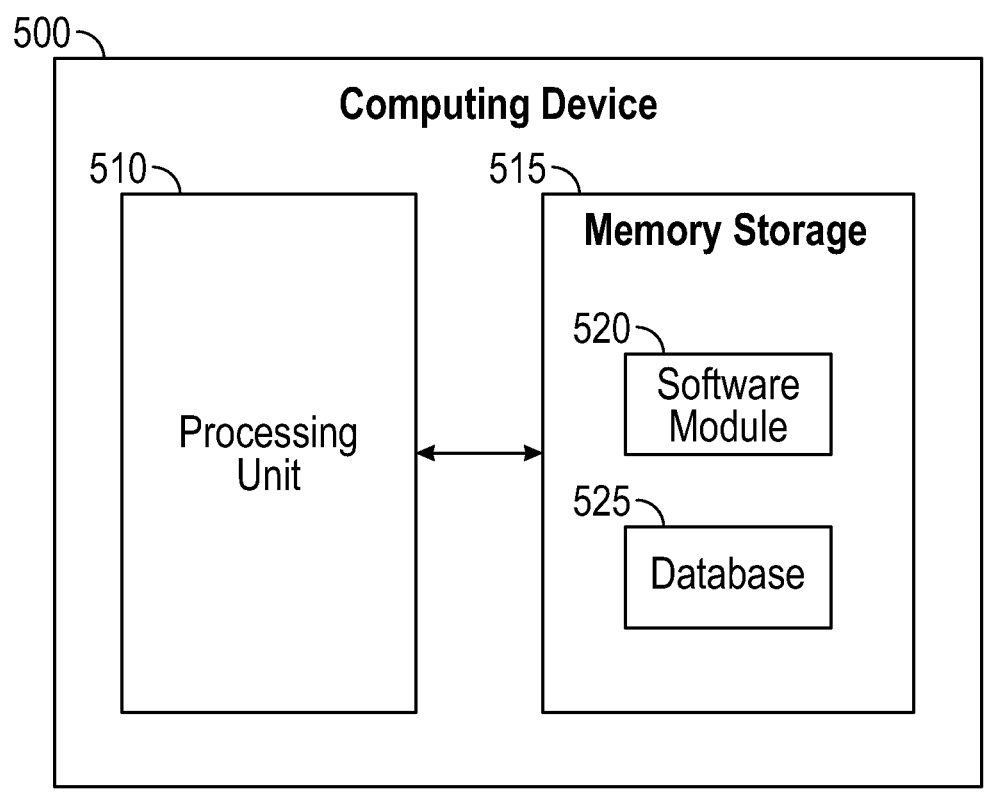
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing neighbor list adaptive mapping as described above with respect to FIG. 2. Computing device 500, for example, may provide an operating environment for controller 106, DNAC 108, first AP 124, second AP 126, third AP 128, fourth AP 130, fifth AP 132, sixth AP 134, or seventh AP 136. Controller 106, DNAC 108, first AP 124, second AP 126, third AP 128, fourth AP 130, fifth AP 132, sixth AP 134, and seventh AP 136 may operate in other environments and are not limited to computing device 500.

Computing device 500 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   sending periodically, at a time interval by a computing device, a request to a client device to provide a client device view of a network wherein a length of the time interval is dependent on a condition at the client device and wherein identity data is associated with the client device;
   receiving, in response to sending the request to the client device, data corresponding to the client device view of the network;
   updating, in response to receiving the data, a map of the network based on the received data corresponding to the client device view of the network, the map being associated with the identity data associated with the client device;
   determining that a variance of a difference between an upstream Received Signal Strength Indicator (RSSI) and a downstream RSSI has increased; and
   decreasing the length of the time interval in response to determining that the variance of the difference between the upstream RSSI and the downstream RSSI has increased.

2. The method of claim 1, wherein the length of the time interval comprises a first value while the condition at the client device comprises the client device being within an inner region of a coverage area of an Access Point (AP), the client device not actively communicating, and the client device not moving.

3. The method of claim 2, wherein the length of the time interval comprises a second value that is greater than the first value when the condition at the client device comprises the client device being within the inner region of the coverage area of the AP, the client device actively communicating, but not using real time flows, and the client device not moving.

4. The method of claim 1, wherein sending periodically the request to the client device is temporality suspended while the condition at the client device comprises the client device being within an inner region of a coverage area of an Access Point (AP), the client device actively communicating using real time flows, and the client device not moving.

5. The method of claim 1, further comprising receiving data corresponding to another client device view of the network, the another client device having a same identity data as the client device and being in a similar location as the client device; and wherein updating the map of the network comprises updating the map of the network based on the received data corresponding to the client device view of the network and the received data corresponding to the another client device view of the network wherein the received data corresponding to the another client device view corresponds to channels different from channels corresponding to the received data corresponding to the client device view.

6. The method of claim 1, wherein the identity data comprises data indicating at least one of: the client device comprising a tablet, the client device comprising a phone, the client device comprising a laptop, an operating system of the client device, and the client device comprising a device type within a family of devices.

7. A system comprising:
one or more memories; and
one or more processors coupled to the one or more memories, wherein the one or more processing units are operative to:
send periodically a request to a client device to provide a client device view of a network wherein a length of a time interval is dependent on a condition at the client device and wherein identity data is associated with the client device;
receive, in response to sending the request to the client device, data corresponding to the client device view of the network;
update, in response to receiving the data, a map of the network based on the received data corresponding to the client device view of the network, the map being associated with the identity data associated with the client device;
determine that a variance of a difference between an upstream Received Signal Strength Indicator (RSSI) and a downstream RSSI has increased; and
decrease the length of the time interval in response to determining that the variance of the difference between the upstream RSSI and the downstream RSSI has increased.

8. The system of claim 7, wherein the length of the time interval comprises a first value while the condition at the client device comprises the client device being within an inner region of a coverage area of an Access Point (AP), the client device not actively communicating, and the client device not moving.

9. The system of claim 8, wherein the length of the time interval comprises a second value that is greater than the first value when the condition at the client device comprises the client device being within the inner region of the coverage area of the AP, the client device actively communicating, but not using real time flows, and the client device not moving.

10. The system of claim 7, wherein the one or more processing units are operative to temporality suspend sending periodically the request to the client device while the condition at the client device comprises the client device being within an inner region of a coverage area of an Access Point (AP), the client device actively communicating using real time flows, and the client device not moving.

11. The system of claim 7, wherein the one or more processing units are further operative to receive data corresponding to another client device view of the network, the another client device having a same identity data as the client device and being in a similar location as the client device; and wherein the one or more processing units being operative to update the map of the network comprises the one or more processing units being operative to update the map of the network based on the received data corresponding to the client device view of the network and the received data corresponding to the another client device view of the network wherein the received data corresponding to the another client device view corresponds to channels different from channels corresponding to the received data corresponding to the client device view.

12. The system of claim 7, wherein the identity data comprises data indicating at least one of: the client device comprising a tablet, the client device comprising a phone, the client device comprising a laptop, an operating system of the client device, and the client device comprising a device type within a family of devices.

13. A non-transitory computer-readable medium that stores a set of instructions which when executed perform a method comprising:
sending periodically, at a time interval by a computing device, a request to a client device to provide a client device view of a network wherein a length of the time interval is dependent on a condition at the client device and wherein identity data is associated with the client device;
receiving, in response to sending the request to the client device, data corresponding to the client device view of the network;
updating, in response to receiving the data, a map of the network based on the received data corresponding to the client device view of the network, the map being associated with the identity data associated with the client device;
determining that a variance of a difference between an upstream Received Signal Strength Indicator (RSSI) and a downstream RSSI has increased; and
decreasing the length of the time interval in response to determining that the variance of the difference between the upstream RSSI and the downstream RSSI has increased.

14. The non-transitory computer-readable medium of claim 13, wherein the length of the time interval comprises a first value while the condition at the client device comprises the client device being within an inner region of a coverage area of an Access Point (AP), the client device not actively communicating, and the client device not moving.

15. The non-transitory computer-readable medium of claim 14, wherein the length of the time interval comprises a second value that is greater than the first value when the condition at the client device comprises the client device being within the inner region of the coverage area of the AP, the client device actively communicating, but not using real time flows, and the client device not moving.

16. The non-transitory computer-readable medium of claim 13, wherein sending periodically the request to the client device is temporality suspended while the condition at the client device comprises the client device being within an inner region of a coverage area of an Access Point (AP), the client device actively communicating using real time flows, and the client device not moving.

17. The non-transitory computer-readable medium of claim 13, further comprising receiving data corresponding to another client device view of the network, the another client device having a same identity data as the client device and being in a similar location as the client device; and wherein updating the map of the network comprises updating the map of the network based on the received data corresponding to the client device view of the network and the received data corresponding to the another client device view of the network wherein the received data corresponding to the another client device view corresponds to channels different from channels corresponding to the received data corresponding to the client device view.

\* \* \* \* \*